United States Patent
Wojciak

(10) Patent No.: US 6,833,196 B1
(45) Date of Patent: Dec. 21, 2004

(54) ACRYLIC-TOUGHENED CYANOACRYLATE COMPOSITIONS

(75) Inventor: Stan Wojciak, New Britain, CT (US)

(73) Assignee: Henkel Corporation, Rocky Hill, CT (US)

( * ) Notice: Subject to any disclaimer, the term of this patent is extended or adjusted under 35 U.S.C. 154(b) by 123 days.

(21) Appl. No.: 10/176,681

(22) Filed: Jun. 24, 2002

(51) Int. Cl.[7] .............................................. B32B 15/06
(52) U.S. Cl. ........................ 428/461; 428/520; 428/522; 156/332
(58) Field of Search ................................ 428/461, 520, 428/522; 526/310, 318; 156/332

(56) References Cited

U.S. PATENT DOCUMENTS

| | | | | |
|---|---|---|---|---|
| 3,183,217 | A | 5/1965 | Serniuk et al. | 260/85.5 |
| 3,963,772 | A | 6/1976 | Takeshita | 260/485 H |
| 4,440,910 | A | 4/1984 | O'Connor | 525/295 |
| 4,477,607 | A | 10/1984 | Litke | 523/212 |
| 4,533,422 | A | 8/1985 | Litke | 156/307.3 |
| 4,556,700 | A | 12/1985 | Harris et al. | 526/209 |
| 4,560,723 | A | 12/1985 | Millet et al. | 524/486 |
| 4,622,414 | A | 11/1986 | McKervey | 560/61 |
| 4,636,539 | A | 1/1987 | Harris et al. | 523/214 |
| 4,695,615 | A | 9/1987 | Leonard et al. | 526/194 |
| 4,718,966 | A | 1/1988 | Harris et al. | 156/331.2 |
| RE32,889 | E | 3/1989 | Litke | 523/212 |
| 4,837,260 | A | 6/1989 | Sato et al. | 524/261 |
| 4,855,461 | A | 8/1989 | Harris | 549/348 |
| 5,340,873 | A | 8/1994 | Mitry | 525/10 |
| 5,994,464 | A | 11/1999 | Ohsawa et al. | 525/85 |
| 6,250,311 | B1 * | 6/2001 | Megna | 132/200 |

FOREIGN PATENT DOCUMENTS

| | | | |
|---|---|---|---|
| JP | 358185666 A | * | 10/1983 |
| JP | 359066473 A | * | 4/1984 |
| WO | WO 96/23532 | * | 8/1996 |

OTHER PUBLICATIONS

P. Klemarczyk, "Adhesion Studies of Mixtures of Ethyl Cyanoacrylate with a Difunctional Cyanoacrylate Monomer and with other Electron–deficient Olefins", *J. Adhesion*, vol. 69, pp. 293–306 (1991).

* cited by examiner

*Primary Examiner*—D. Lawrence Tarazano
(74) *Attorney, Agent, or Firm*—Steven C. Bauman

(57) ABSTRACT

A cyanoacrylate adhesive composition having an acrylic monomer toughening agent. Preferably, the acrylic monomers are selected from the group consisting of methyl methacrylate, butyl acrylate, cyclohexyl acrylate, isobornyl acrylate, and combinations thereof. A useful amount of acrylic monomers is about 1.0% by weight to about 10.0% by weight, preferably about 1.0% by weight to about 5.0% by weight, and more preferably about 2.0% by weight to about 5.0% by weight.

16 Claims, No Drawings

US 6,833,196 B1

ACRYLIC-TOUGHENED CYANOACRYLATE COMPOSITIONS

FIELD OF THE INVENTION

This invention relates to acrylic toughened cyanoacrylate compositions.

BRIEF DESCRIPTION OF THE RELATED TECHNOLOGY

Cyanoacrylate compositions are well known as adhesives for a variety of substrates. However, traditional cyanoacrylate-based adhesives tend to be brittle after cure. A variety of additives and fillers have been added to cyanoacrylate adhesive compositions to improve its toughness.

U.S. Pat. No. 3,183,217 to Serniuk et al. discloses free radical polymerization of a methacrylic acid or methyl methacrylate monomer with a non-polar or mildly polar olefin where the monomer is completed with a Friedel-Crafts halide. Also disclosed is the polymerization of acrylonitrile and various olefins.

U.S. Pat. No. 3,963,772 to Takeshita discloses liquid telomers of alkylene and acrylic monomers which result in short chain alternating copolymers substantially terminated at one end of the polymer chains with the more reactive alkylene units. The liquid telomers are useful in making elastomeric polymers for high molecular weight rubbers which permit the ready incorporation of fillers, additives, and the like, due to its liquid phase.

U.S. Pat. No. 4,440,910 to O'Connor is directed to cyanoacrylate compositions having improved toughness, achieved through the addition of elastomers, i.e., acrylic rubbers. These rubbers are either (i) homopolymers of alkyl esters of acrylic acid; (ii) copolymers of another polymerizable monomer, such as lower alkenes, with an alkyl ester of acrylic acid or with an alkoxy ester of acrylic acid; (iii) copolymers of alkyl esters of acrylic acid; (iv) copolymers of alkoxy esters of acrylic acid; and (v) mixtures thereof.

U.S. Pat. No. 4,560,723 to Millet et al. discloses a cyanoacrylate adhesive composition containing a toughening agent comprising a core-shell polymer and a sustainer comprising an organic compound containing one or more unsubstituted or substituted aryl groups. The sustainer is reported to improve retention of toughness after heat aging of cured bonds of the adhesive. The core-shell polymer is treated with an acid wash to remove any polymerization-causing impurities such as salts, soaps or other nucleophilic species left over from the core-shell polymer manufacturing process.

U.S. Pat. No. 5,340,873 to Mitry discloses a cyanoacrylate adhesive composition having improved toughness by including an effective toughening amount of a polyester polymer derived from a dibasic aliphatic or aromatic carboxylic acid and a glycol.

U.S. Pat. No. 5,994,464 to Ohsawa et al. discloses a cyanoacrylate adhesive composition containing a cyanoacrylate monomer, an elastomer miscible or compatible with the cyanoacrylate monomer, and a core-shell polymer being compatible, but not miscible, with the cyanoacrylate monomer.

The known toughening agents mentioned above generate or contain acid impurities which can cause hydrolysis of the cyanoacrylate monomer, forming carboxylic acids which drastically retard cure speed, contribute to a rapid deterioration in adhesive performance, and require high concentrations of stabilizers. Toughening agents such as core shell polymers have been shown to be inconsistent in performance and can be difficult to formulate.

Thus, it would be desirable to provide a toughening agent for cyanoacrylate compositions which has reduced acid generation such that cure speeds and consistent adhesive performance are not inhibited, easy to formulate, and use lower concentrations of stabilizers.

SUMMARY OF THE INVENTION

The present invention is directed to, in a first aspect, a cyanoacrylate composition which demonstrates enhanced toughness and faster fixturing speeds including: a cyanoacrylate component; and a toughening agent including one or more acrylic monomers. Preferably, the one or more acrylic monomer(s) are monofunctional, although not limited to such, and include methyl methacrylate, butyl acrylate, cyclohexyl methacrylate, isobornyl acrylate, and combinations thereof, and may be present in an amount of about 1% by weight to about 5% by weight of the composition. Most preferred acrylic monomers include butyl acrylate monomers, isobornyl acrylate monomers, methyl methacrylate monomers, a combination of methyl methacrylate and butyl acrylate monomers, or a combination of isobornyl acrylate and methyl methacrylate.

In another aspect, the present invention is directed to a cyanoacrylate composition which demonstrates enhanced toughness including: a cyanoacrylate component; an acrylic monomer toughening agent; and one or more additives selected from the group consisting of plasticizers, accelerators, fillers, opacifiers, thickeners, viscosity modifiers, inhibitors, thixotrophy conferring agents, stabilizers, dyes, thermal degradation enhancers, and combinations thereof, where upon cure, the cyanoacrylate composition has an average tensile shear strength of over 4400 psi after curing at room temperature for 72 hours and 2 hours post cure at 121° C.

In yet another aspect, the present invention is directed to cyanoacrylate adhesive composition including about 75% to 98% by weight of a cyanoacrylate component based on a total weight of the composition; about 1% to about 10% by weight of an acrylic monomer toughening agent, the acrylic monomer being selected from butyl acrylate, isobornyl acrylate, methyl. methacrylate, and combinations thereof; and one or more additives selected from the group consisting of accelerators, fillers, opacifiers, thickeners, viscosity modifiers, inhibitors, thixotrophy conferring agents, stabilizers, and combinations thereof.

In still yet another aspect, the present invention is directed to a method of bonding two or more substrates including the steps of: providing at least two substrates; dispensing, on at least a portion of a surface of one or both of the at least two substrates, a cyanoacrylate adhesive composition including: a cyanoacrylate component; and a toughening agent including one or more acrylic monomers; contacting the surfaces of the at least two substrates having the cyanoacrylate adhesive composition thereon; and curing the cyanoacrylate adhesive composition.

In an additional aspect, the present invention is directed to a bonded assembly including: a first substrate having a first surface; another substrate having a second surface; and a cured cyanoacrylate adhesive composition disposed between the first and second surfaces, the composition having included prior to cure: a cyanoacrylate component; and a toughening agent selected from butyl acrylate, isobornyl acrylate, methyl methacrylate, or combinations thereof. Once cured, the toughening agent is copolymerized with the cyanoacrylate component. Preferably, the peel strength of the composition is greater than about 6 pounds/inch after room temperature cure of about 72 hours. Preferably, the tensile shear strength of the composition is greater than about 4400 psi after 72 hours at room temperature and 2 hours post cure at 121° C.

DETAILED DESCRIPTION OF THE INVENTION

The cyanoacrylate compositions of the present invention include toughening agents which provide reduced acid generation over prior art toughening agents such that cure speeds and deterioration of a resultant adhesive are minimized while providing thermal resistance and toughness in the cured compositions. The toughening agents useful in the present invention include one or more acrylic monomers. A method of bonding substrates and the resultant bonded assembly are disclosed herein as well.

The cyanoacrylate compositions of the present invention include cyanoacrylate component which include cyanoacrylate monomers, such as those represented by the structure;

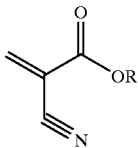

where $R^1$ is selected from $C_{1-16}$ alkyl, alkoxyalkyl, cycloalkyl, alkenyl, aralkyl, aryl, ally and haloalkyl groups. Preferably, the cyanoacrylate, monomer is selected from methyl cyanoacrylate, ethyl-2-cyanoacrylate, propyl cyanoacrylates, butyl cyanoacrylates (such as n-butyl-2-cyanoacrylate), octyl cyanoacrylates, allyl cyanoacrylate, β-methoxyethyl cyanoacrylate and combinations thereof. A particularly desirable cyanoacrylate monomer is ethy-2-cyanoacrylate. The cyancacrylate component should be included in the compositions in an amount within the range of about 75.0% by weight to about 98.0% by weight, preferably about 85.0% by weight to about 90% by weight.

The compositions of the present invention may also contain additives such as stabilizers, accelerators, plasticizers, fillers, opacifiers, thickeners, viscosity modifiers, inhibitors, thixotrophy conferring agents, dyes, thermal degradation enhancers, combinations thereof, and the like. These additives are known to those of skill in the art.

The cyanoacrylate monomers are preferably stabilized using acid stabilizers of the Lewis or protonic types although combinations of nonvolatile sulfonic acids with gaseous stabilizers such as NO, $SO_2$, $SO_3$, $BF_3$, and HF can provide a synergistic effect. A preferred stabilizer system for the present invention includes methane sulfonic acid (MSA) and $SO_2$. Preferably, the amount of MSA is about 5 to about 25 ppm and a preferred amount of $SO_2$ is about 2 to about 30 ppm based on the amount of the cyanoacrylate monomer. More preferably, $BF_3$, another acidic gaseous stabilizer, may also be added in amounts of about 5 ppm to about 50 ppm based on the amount of the cyanoacrylate monomer. Advantageously, such small amounts of stabilizers used with the compositions of the present invention provide optimal performance without stability concerns.

Inhibitors or free radical scavengers that may be useful in the cyanoacrylate compositions are of the phenolic type such as quinone, hydroquinone, t-butyl catechol, p-methoxyphenol, and the like. A preferred inhibitor of the present invention is hydroquinone. The inhibitor is present in an amount of about 0.001% by weight to about 2.0% by weight, preferably about 0.02% to about 1.0% by weight.

Accelerators that may be useful in the cyanoacrylate compositions include a first accelerator component which may be selected from calixarenes, oxacalixarenes, and combinations thereof. Of the calixarenes and oxacalixarenes, many are known, and are reported in the patent literature. See e.g. U.S. Pat. Nos. 4,556,700, 4,622,414, 4,636,539, 4,695,615, 4,718,966, and 4,855,461, the disclosures of each of which are hereby expressly incorporated herein by reference.

Another accelerator component is a crown ether. A host of crown ethers are known. For instance, examples which may be used herein either individually or in combination, or in combination with other first accelerators include 15-crown-5, 18-crown-6, dibenzo-18-crown-6, benzo-15-crown-5, dibenzo-24-crown-8, dibenzo-30-crown-10, tribenzo-18-crown-6, asym-dibenzo-22-crown-6, dibenzo-14-crown-4, dicyclohexyl-18-crown-6, dicyclohexyl-24-crown-8, cyclohexyl-12-crown-4, 1,2-decalyl-15-crown-5, 1,2-naphtho-15-crown-5, 3,4,5-naphthyl-16-crown-5, 1,2-methyl-benzo-18-crown-6, 1,2-methylbenzo-5, 6-methylbenzo-18-crown-6, 1,2-t-butyl-18-crown-6, 1,2-vinylbenzo-15-crown-5, 1,2-vinylbenzo-18-crown-6, 1,2-t-butyl-cyclohexyl-18-crown-6, asym-dibenzo-22-crown-6 and 1,2-benzo-1,4-benzo-S-oxygen-20-crown-7. See U.S. Pat. No. 4,837,260 (Sato), the disclosure of which is hereby expressly incorporated here by reference.

The accelerator component should be included in the compositions in an amount within the range of from about 0.01% to about 10% by weight, with the range of about 0.1% to about 5% by weight being desirable, and about 0.1% to about 1% by weight of the total composition being particularly desirable.

Phthalic anhydride and other plasticizers may also be added to the cyanoacrylate component to further aid in durability and impact, heat, and moisture resistance. The plasticizer is preferably present in an amount of about 0.005% by weight to about 5.0% by weight, more preferably about 0.01% by weight to about 2.0% by weight of the total composition.

The inventive compositions may also be rendered thixotropic by the addition of thixotropy-conferring agents, such as fumed silicas. See U.S. Pat. No. 4,477,607 (Litke), U.S. Pat. No. 4,533,422 (Litke) and U.S. Re. Pat. No. 32,889 (Litke) and U.S. Pat. No. 4,837,260 (Sato). Thixotropy-conferring agents should be included in the inventive compositions an amount less than about 12%, such as within the range of about 4% to about 8%, by weight of the total composition.

The inventive compositions may also be thickened by the addition of thickeners, such as polymethyl(meth)acrylate, in order to increase viscosity. Thickeners should be included in the inventive composition in an amount less than about 12%, such as within the range of about 4% to about 8%, such as about 6%, by weight of the total composition.

The combination of the cyanoacrylate monomer and the additives will be referred to herein as the cyanoacrylate component.

The cyanoacrylate compositions of the present invention are typically cured using an anionic mechanism utilizing free radical generation. The layer of moisture inherently adsorbed on the surfaces of virtually all materials is sufficient to initiate polymerization of the cyanoacrylate component. The hydroxyl groups of the water molecules effectively act to initiate polymerization as carbanions are generated at a rapid rate. The polymerization reaction will continue until all available monomer is consumed or until growth is inhibited by an acidic species.

The toughening agents useful in the present invention include one or more acrylic monomers represented by the formula:

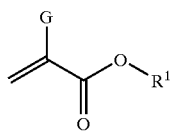

where G is hydrogen, halogen, or an alkyl having from 1 to 4 carbon atoms, $R^1$ has from 1 to 16 carbon atoms and is an alkyl, cycloalkyl, alkenyl, cycloalkenyl, alkaryl, aralkyl, or aryl group, optionally substituted or interrupted with silane, silicon, oxygen, halogen, carbonyl, hydroxyl, ester, carboxylic acid, urea, urethane, carbamate, amine, amide, sulfur, sulfonate, or sulfone. Preferably, the acrylic monomers are monofunctional although difunctional monomers may provide further copolymerization with the cyanoacrylate component. Most preferred acrylic monomers are methyl methacrylate, butyl acrylate, cyclohexyl acrylate, isobornyl acrylate, or a combination thereof. A useful amount of acrylic monomers is about 1.0% by weight to about 10.0% by weight, preferably about 1.0% by weight to about 5.0% by weight, and more preferably about 2.0% by weight to about 5.0% by weight.

By the term "acrylic" is meant acrylic or methacrylic.

Although other acrylic monomers may be utilized as a toughening agent in the present invention, they must be compatible with the cyanoacrylate monomer. By the term "compatible" is meant that the acrylic monomers do not significantly interfere with the storage stability of the adhesive composition. Preferably, the monomers are at least partially solvated by the cyanoacrylate monomer so that a homogenous solution or suspension is formed.

The cyanoacrylate adhesive compositions of the present invention are easily prepared by adding predetermined amounts of the toughening agent to the cyanoacrylate component and conducting stirring for a sufficient time and temperature to achieve a homogenous solution or suspension. Typically, higher temperatures are not necessary as the acrylic monomers tend to readily dissolve in the cyanoacrylate component. However, in formulations containing high levels of fillers, thickeners, and the like, heating at low temperatures may be desirable.

The cyanoacrylate adhesive compositions of the present invention are useful in bonding two or more substrates. A sufficient portion of the composition may be placed on a surface of one of the two or more substrates. The other substrate is then positioned over the cyanoacrylate composition and the two substrates contacted together to form an assembly. The assembly is then exposed to favorable cure conditions to cure the cyanoacrylate composition. Substrates which may be bonded by cyanoacrylate adhesives are well known in the art and may be used with the adhesive formulations of the present invention. Advantageously, substrates which are oily, such as galvanized steel, have improved fixturing speeds and adhesion when using cyanoacrylate adhesive compositions of the present invention. Unexpectedly, typical fixturing speeds of the cyanoacrylate compositions of the present invention for steel and EPDM rubber were less than about 10 seconds in comparison to comparative Example 11 below, where the fixturing speed was about 20 to about 30 seconds.

The improved toughness of the cured compositions of this invention is manifested through various physical properties, such as 180° peel strength, and tensile shear strength. These strengths are indicative of a useful bond strength. Peel strength was determined in accordance with procedures of the American Standard Test Methods (ASTM) No. D-903-49; tensile shear strength was determined in accordance with ASTM No. D-1002. Such test methods are incorporated herein by reference.

EXAMPLES

The following example describes the preparation and use of the cyanoacrylate compositions of the present invention. These example are presented for the purpose of further illustrating and explaining the invention, and are not to be taken as limiting the scope of the invention.

A typical procedure for preparing an adhesive composition of the present invention for the examples below is set forth as follows:

1. Ethyl-2-cyanoacrylate monomer was stabilized with 20 ppm $BF_3$.
2. The acrylic monomer was added to the cyanoacrylate monomer, with mild heating if necessary, and the resultant batch composition stirred until the acrylic monomer dissolved and a substantially homogenous solution was obtained.
3. Phthalic anhydride, 0.5% by weight, was added to the batch composition with stirring until a homogenous mixture was obtained.

The substrates used in determining peel strength are sand blasted steel bonded to sand blasted, flexible steel shims. Tensile shear strength was determined using sand blasted steel lap shear bonded to another sand blasted steep lap shear. Unexpectedly, typical fixturing speeds of the cyanoacrylate compositions of the present invention for these substrates were less than about 20 seconds in comparison to comparative Example 11 where the fixturing speed was about 40 to about 60 seconds.

TABLE I

| | | Comparison of Peel Strength & Tensile Shear Strength | | | | | |
|---|---|---|---|---|---|---|---|
| Ex. | Acrylic Monomer (% by wt) | Peel Strength[1] (lbs/in) | Peel Strength[2] (lbs/in) | Peel Strength[3] (lbs/in) | Tensile Shear Strength[1] (psi) | Tensile Shear Strength[2] (psi) | Tensile Shear Strength[3] (psi) |
| 1 | 2% BA | 10.2 | 5.4 | −0.8 | 2676 | 4470 | 3102 |
| 2 | 5% BA | | | | 2556 | 4744 | 3730 |

TABLE I-continued

Comparison of Peel Strength & Tensile Shear Strength

| Ex. | Acrylic Monomer (% by wt) | Peel Strength[1] (lbs/in) | Peel Strength[2] (lbs/in) | Peel Strength[3] (lbs/in) | Tensile Shear Strength[1] (psi) | Tensile Shear Strength[2] (psi) | Tensile Shear Strength[3] (psi) |
|---|---|---|---|---|---|---|---|
| 3 | 2% IA | 14.6 | 5.6 | 3.1 | 2524 | 4648 | 2358 |
| 4 | 5% IA | 11.9 | 3.1 | 0.7 | 2746 | 4633 | 3015 |
| 5 | 2% CM | | | | 2588 | 4696 | 1338 |
| 6 | 5% CM | | | | 2634 | 3918 | 1500 |
| 7 | 2% MM | | | | 2834 | 4718 | 2614 |
| 8 | 5% MM | | | | 1970 | 4920 | 2638 |
| 9 | 2% MM + 2% BA | | | | 2646 | 4798 | 3086 |
| 10 | 2.5% IA + 2.5% MM | | | | 2044 | 4792 | 3284 |
| 11 | — | 5.9 | 3.5 | 2.2 | 2675 | 4354 | 2490 |
| BM | — | | | | 2738 | 3160 | 4028 |
| CS | — | 5.1 | 2.5 | 0.7 | 2952 | 5062 | 3996 |

BA = butyl acrylate;
IA = isobornyl acrylate;
CM = cyclohexyl methacrylate;
MM = methyl methacrylate;
PC = post cure at 121° C.;
CS = Contains 8% by weight core-shell polymers from Rohn-Haas Co., Philadelphia, PA (Ex. 13);
BM = BLACK MAX ® available from Loctite Corp., Rocky Hill, CT (Ex. 12).
[1]72 hour cure at room temperature;
[2]72 hour cure at room temperature + 2 hours post cure at 121° C.;
[3]72 hour cure at room temperature + 24 hours post cure at 121° C.

The cyanoacrylate adhesive compositions of the present invention containing a toughening agent including one or more acrylic monomers show similar or improved peel strengths and tensile shear strengths in comparison with non-toughened cynoacrylate compositions such as compositions containing core-sell polymers, and BLACK MAX®. The most preferred compositions contain butyl acrylate monomers, isobornyl acrylate monomers, methyl methacrylate monomers, and the combinations of methyl methacrylate and bytyl acrylate monomers, and isobornyl acrylate and methyl methacrylate. Furthermore, the compositions of the present invention provide accelerated fixturing speeds, ease of formulation, decreased acid generation, lower use of stabilizers without comprising performance, and performance consistency.

What is claimed is:

1. A method of enhancing the toughness of a cyanoacrylate composition between steel and EPDM rubber substrates, comprising the steps of:

providing a cyanoacrylate component; and providing a toughening agent comprising methyl methacrylic monomer and at least one of butyl acrylic monomer and isobornyl acrylic monomer, whereby the acrylic monomer toughening agent enhances the toughness of the cyanoacrylate composition such that whereupon cure, the cyanoacrylate composition has an average tensile shear strength of over about 4400 psi after 72 hours at room temperature sure and 2 hours post cure at 121° C.

2. The method of claim 1 wherein said cyanoacrylate component comprises a monomeric structure represented by:

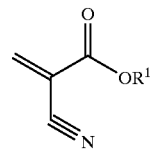

wherein $R^1$ is $C_{1-15}$ alkyl, alkoxyalkyl, cycloalkyl, alkenyl, aryl, aralkyl, allyl, alkyhalide, or haloalkyl.

3. The method of claim 2 wherein said cyanoacrylate coponent comprises a member selected from the group consisting of methyl cyanoacrylate, ethyl-2-cyanoacrylate, propyl cyanoacrylates, butyl cyanoacrylates, octyl cyanoacrylates, allyl cyanoacrylatee, β-methoxyethyl cyanoacrylate, and combinatione thereof.

4. The method of claim 3 wherein said cyanoacrylate component comprises ethyl-2-cyanoacrylate.

5. The method of claim 1 wherein said acrylic monomer toughening agent is represented by the formula:

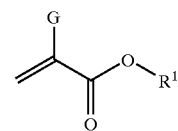

wherein G is hydrogen, halogen, or an alkyl having from 1 to 4 carbon atoms, $R^1$ has from 1 to 16 carbon atows and is an alkyl, cycloalkyl, alkenyl, cycloalkenyl, alkaryl, aralkyl, or aryl group, optionally substituted or interrupted with silane, silicon, oxygen, halogen, carbonyl, hydroxyl, ester, carboxylic acid, urea, urethane, carbamate, amine, amide, sulfur, sulfonate, or sulfone.

6. The method of claim 1 wherein said acrylic monomer toughening agent is selected from the group consisting of methyl methacrylate, butyl acrylate, cyclohexyl methacrylate, isobornyl acrylate, and combinations thereof.

7. The method of claim 1 wherein said acrylic monomer toughening agent is present in an amount of about 1% to about 5% by weight.

8. The method of claim 1 further comprising providing an additive selected from the group consisting of stabilizers, accelerators, plasticizers, fillers, opacifiers, thickeners, viscosity mocufiers, inhibitors, thixotrophy conferring agents, dyes, thermal degradation enhancers, and combinations thereof.

9. A method of enhancing the toughness of a cyanoacrylate composition which demonstrates enhanced toughness comprising the steps of:
providing a cyanoacrylate component;
providing an acrylic monomer toughening agent comprising methyl methacrylic monomer and at least one of butyl acrylic monomer and isobornyl acrylic monomer; and
providing one or more additives selected from the group consisting of stabilizers, accelerators, plasticizers, fillers, opacifiers, thickeners, viscosity modifiers, inhibitors, thixotrophy conferring agents, dyes, thermal degradation enhancers, and combinations thereof, where upon cure, the cyanoacrylate composition has an average tensile shear strength of over about 4400 psi after 72 hours at room temperature cure and 2 hours post cure at 121° C.

10. A method of enhancing the toughness of a cyanoacrylate adhesive composition, comprising the steps of:
providing about 75% to 98% by weight of a cyanoacrylate component based on a total weight of said composition;
providing about 1% to about 10% by weight of an acrylic monomer toughening agent comprising methly methacrylic monomer and at least one of butyl acrylic monomer and isobornyl acrylic monomer; and
providing one or more additives selected from the group consieting of stabilizers, accelerators, plasticizers, fillers, opacifiera, thickeners, viscosity modifiers, inhibitors, thixotrophy conferring agents, dyes, thermal degradation enhancers, and combinations thereof.

11. The method of claim 10 wherein said acrylic monomer toughening agent is in an amount of about 2% to about 5% by weight.

12. A method of bonding two or more substrates comprising the steps of:
providing at least two substrates;
dispensing, on a surface of one or both of the at least two substrates, a cyanoacrylate adhesive composition comprising:
a cyanoalrylate component; and
an acrylic monomer toughening agent comprising methyl methacrylic monomer and at least one of butyl acrylic monomer and isobornyl acrylic monomer;
contacting the surfaces of the at least two substrates having the cyanoacrylate adhesive composition thereon; and
exposing the cyanoacrylate adhesive composition to cure conditions, wherein the cured cyanoacrylate demonstrates a tensile shear strength greater than about 4400 psi after room temperature cure of about 72 hours and 2 hours post cure at 121° C.

13. The method of claim 12 wherein the at least two substrates comprise steel and EPDM rubber having a fixturing speed of less than 10 seconds.

14. The method of claim 12 wherein after the step of contacting the surfaces of the at least two substrates having the cyanoacrylate adhesive composition thereon, a fixturing speed of the cyanoacrylate composition is less than 10 seconds.

15. A bonded assembly comprising:
a first substrate constructed from steel having a first surface;
another substrate constructed from EPDM rubber having a second surface; and
a cured cyanoacrylate adhesive composition disposed between said first and second surfaces, said composition, prior to cure, comprising:
a cyanoacrylate component; and
an acrylic monomer toughening agent comprising methyl methacrylic monomer and at least one of butyl acrylic monomer and isobornyl acrylic monomer, the toughening agent being cross-linked with the cyanoacrylate component upon curing so that the cured cyanoacrylate demonstrates a tensile shear strength greater than about 4400 psi after room temperature cure of about 72 hours and 2 hours post cure at 121° C.

16. The bonded assembly of claim 15 wherein the cured cyanoacrylate demonstrates a peel strength greater than about 6 pounds/inch after room temperature cure of about 72 hours.

* * * * *